United States Patent
Lin et al.

(10) Patent No.: US 8,653,147 B2
(45) Date of Patent: Feb. 18, 2014

(54) INORGANIC/ORGANIC DISPERSANT AND APPLICATION THEREOF

(75) Inventors: Jiang-Jen Lin, Taipei (TW); Yen-Chi Hsu, Taipei (TW); Ming-Li Chiang, Taipei (TW); Chien-Chia Chu, Taipei (TW)

(73) Assignee: National Taiwan University, Taipei (TW)

( * ) Notice: Subject to any disclaimer, the term of this patent is extended or adjusted under 35 U.S.C. 154(b) by 11 days.

(21) Appl. No.: 13/300,585

(22) Filed: Nov. 20, 2011

(65) Prior Publication Data

US 2012/0065053 A1    Mar. 15, 2012

Related U.S. Application Data

(62) Division of application No. 12/146,449, filed on Jun. 26, 2008, now abandoned.

(30) Foreign Application Priority Data

Dec. 7, 2007  (TW) .............................. 96146916 A

(51) Int. Cl.
 *B01F 3/12* (2006.01)
 *C01B 33/44* (2006.01)
 *B01J 31/26* (2006.01)

(52) U.S. Cl.
 USPC ............... 516/33; 516/23; 516/101; 516/110; 106/436; 106/450; 106/456; 106/460; 106/468; 106/287.17; 106/287.19; 524/403; 524/413; 524/430; 524/431

(58) Field of Classification Search
 USPC ................... 252/363.5; 516/23, 101, 110, 33; 106/436, 450, 456, 468, 487, 287.17, 106/287.19; 524/403, 413, 430, 431
 See application file for complete search history.

(56) References Cited

U.S. PATENT DOCUMENTS 3,126,355 A * 3/1964 Birten et al. ................. 524/21
4,743,305 A * 5/1988 Doidge et al. ............. 106/468

(Continued)

FOREIGN PATENT DOCUMENTS

TW  550246  *  9/2003
TW  577904  *  3/2004

(Continued)

OTHER PUBLICATIONS

Jiang-Jen Lin et al, "Copolymer-Layered Silicate Hybrid Surfactants from the Intercalation of Montmorillonite with Amphiphilic Copolymers", Langmuir 2003, 19, 5184-5187 (May 30, 2003—Web).*

(Continued)

*Primary Examiner* — Daniel S Metzmaier
(74) *Attorney, Agent, or Firm* — Pai Patent & Trademark Law Firm; Chao-Chang David Pai

(57) ABSTRACT

The present invention discloses an inorganic/organic mixed component (I/O) dispersant and applications thereof, which is primarily applied to dispersing nanoparticles of metal oxides. The I/O dispersant of the present invention can be a composite of inorganic clay and an organic surfactant, a composite of inorganic clay and polyoxyalkylene-amine, or a composite of inorganic clay, polyisobutylene succinic anhydride (PIB-SA) and hydrochloric acid salt or tetraalkyl quaternary salt of polyoxyalkylene-amine, or fatty amines. By mixing with the I/O dispersant of the present invention, nanoparticles of a metal oxide can be uniformly dispersed without aggregation particularly at high solid content. The dispersion has a lower viscosity and is relatively stable in storage even at high temperature.

6 Claims, 2 Drawing Sheets

(56) References Cited

U.S. PATENT DOCUMENTS

| | | | | |
|---|---|---|---|---|
| 5,853,886 A * | 12/1998 | Pinnavaia et al. | | 428/403 |
| 5,939,475 A * | 8/1999 | Reynolds et al. | | 524/230 |
| 5,993,769 A * | 11/1999 | Pinnavaia et al. | | 423/331 |
| 6,391,449 B1 * | 5/2002 | Lan et al. | | 428/402 |
| 6,646,026 B2 * | 11/2003 | Fan et al. | | 523/205 |
| 6,765,050 B2 * | 7/2004 | Lin et al. | | 524/445 |
| 6,822,019 B2 * | 11/2004 | Lin et al. | | 523/216 |
| 6,828,371 B2 * | 12/2004 | Lee et al. | | 524/445 |
| 6,861,462 B2 * | 3/2005 | Parker et al. | | 524/445 |
| 7,022,299 B2 * | 4/2006 | Lin et al. | | 523/216 |
| 7,094,815 B2 * | 8/2006 | Lin et al. | | 523/216 |
| 7,495,043 B2 * | 2/2009 | Lin et al. | | 523/216 |
| 2003/0134957 A1 * | 7/2003 | Lin et al. | | 524/445 |
| 2003/0149155 A1 * | 8/2003 | Lin et al. | | 524/445 |
| 2004/0069188 A1 * | 4/2004 | Lin et al. | | 106/486 |
| 2004/0087700 A1 * | 5/2004 | Ross et al. | | 524/443 |
| 2007/0015853 A1 * | 1/2007 | Weng et al. | | 523/333 |
| 2007/0072981 A1 * | 3/2007 | Miller | | 524/445 |
| 2011/0240196 A1 * | 10/2011 | Tse | | 152/511 |

FOREIGN PATENT DOCUMENTS

| | | | |
|---|---|---|---|
| TW | 270529 | * | 1/2007 |
| TW | 280261 | * | 5/2007 |
| TW | 284138 | * | 7/2007 |

OTHER PUBLICATIONS

Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0 , headword =amine, fatty amine, quaternary ammonium salt, (Knovel Release Date: Sep. 4, 2003; downloaded Nov. 6, 2012), pp. 1-2.*

Derwent Abstract, week 200907, London: Derwent Publications Ltd., AN 2008-D79385, Class A21, TW 280261 B1, (Univ Taiwan Nat), abstract, pp. 1-2.*

Derwent Abstract, week 200956, London: Derwent Publications Ltd., AN 2008-F79761, Class A94, TW 284138 B1, (Univ Nat Chung Hsing), abstract, pp. 1-2.*

Derwent Abstract, week 200958, London: Derwent Publications Ltd., AN 2008-C73977, Class A25, TW 270529 B1, (Univ Nat Chung Hsing), abstract, pp. 1-2.*

Derwent Abstract, week 200457, London: Derwent Publications Ltd., AN 2004-590885, Class A25, TW 577904 A, (Univ Nat Chung Hsing), abstract, pp. 1-2.*

Derwent Abstract, week 200420, London: Derwent Publications Ltd., AN 2004-212056, Class A25, TW 550246 A, (Univ Nat Chung Hsing), abstract, pp. 1-2.*

Machine Translation of Publ. No. TW 280261 (Bulletin No. I280261), published May 2007, Taiwan Patent Office, obtained online @ http://worldwide.espacenet.com/?locale=EN_ep (Downloaded Sep. 25, 2013), pp. 1-14.*

Machine Translation of Publ. No. TW 284138 (Bulletin No. I284138), published Jul. 2007, Taiwan Patent Office, obtained online @ http://worldwide.espacenet.com/?locale=EN_ep (Downloaded Sep. 25, 2013), pp. 1-13.*

Machine Translation of Publ. No. TW 270529 (Bulletin No. I270529), published Jan. 2007, Taiwan Patent Office, obtained online @ http://worldwide.espacenet.com/?locale=EN_ep (Downloaded Sep. 25, 2013), pp. 1-9.*

Machine Translation of Publ. No. TW 577904 (Bulletin No. 577904), published Mar. 2004, Taiwan Patent Office, obtained online @ http://worldwide.espacenet.com/?locale=EN_ep (Downloaded Sep. 25, 2013), pp. 1-14.*

Machine Translation of Publ. No. TW 550246 (Bulletin No. 550246), published Sep. 2003, Taiwan Patent Office, obtained online @ http://worldwide.espacenet.com/?locale=EN_ep (Downloaded Sep. 25, 2013), pp. 1-11.*

* cited by examiner (A) (B)

INORGANIC/ORGANIC DISPERSANT AND APPLICATION THEREOF

CROSS REFERENCE TO RELATED APPLICATIONS

The present application is a division of prior U.S. application Ser. No. 12/146,449 filed Jun. 26, 2008, entitled "INORGANIC/ORGANIC DISPERSANT AND APPLICATION THEREOF", which is now abandoned. The prior U.S. Application claims priority of Taiwan Patent Application No. 096146916, filed on Dec. 7, 2007, the entirety of which is incorporated herein by reference.

BACKGROUND OF THE INVENTION

1. Field of the Invention

The present invention relates to an I/O (inorganic/organic) dispersant and applications thereof, and particularly to an I/O dispersant which is applied to dispersing nanoparticles of metal oxides, for example, white pigment and photocatalyst made from $TiO_2$.

2. Related Prior Arts

For application of $TiO_2$ in commercial articles and industrial processes, it's always a technical issue to efficiently disperse $TiO_2$ particles or powders into a solvent. Different sizes of $TiO_2$ can be applied to different fields, for example, nanoparticles of $TiO_2$ can be used as photocatalysts, microparticles of $TiO_2$ can be used as paints.

The well known method for dispersing $TiO_2$ consists in adding a general organic surfactant or a polymeric dispersant. The surfactant or dispersant primarily includes different segments with respective affinities to the solvent and the dispersed particles, so that the dispersant can be effectively attached to surfaces of the $TiO_2$ particles and also dispersed in the solvent. By means of steric hindrance of the dispersant, the $TiO_2$ particles will be stable and no longer aggregate in the solvent.

However, the effect of the dispersant is easily influenced by temperature and time. Once the dispersant is desorbed or isolated from the surfaces of the $TiO_2$ particles, the dispersant will be unstable with aggregation.

To solve the above problem, the present invention provides an I/O dispersant which is suitable for application of $TiO_2$ particles.

SUMMARY OF THE INVENTION

The object of the present invention is to provide an I/O dispersant, which can effectively disperse nanoparticles of a metal oxide.

Another object of the present invention is to provide a method for dispersing nanoparticles of a metal oxide by applying the aforementioned I/O dispersant, so that the nanoparticles can be uniformly dispersed.

To achieve the above objects, the I/O dispersant of the present invention can be a composite of inorganic clay and an organic surfactant; and the I/O dispersant is produced by reacting the inorganic clay with the organic surfactant.

The I/O dispersant of the present invention can also be a composite of inorganic clay and polyoxyalkylene-amine; and the I/O dispersant is produced by reacting the inorganic clay with the polyoxyalkylene-amine.

The I/O dispersant of the present invention can further be a composite of inorganic clay, polyisobutylene succinic anhydride (PIB-SA, Mw=300~2000 g/mol) and polyoxyalkylene-amine; and the I/O dispersant is produced by reacting the inorganic clay with PIB-SA grafted with polyoxyalkylene-amine.

The I/O dispersant of the present invention can be produced by reacting the inorganic clay with fatty amine quaternary ammonium salt of C12~C32.

In the present invention, the method for dispersing nanoparticles of a metal oxide comprises mixing the I/O dispersant and the nanoparticles of the metal oxide.

The I/O dispersant of the present invention can be used for dispersing such metal oxides as $SiO_2$, $Fe_2O_3$, $Al_2O_3$, ZrO, $Ag_2O$, $TiO_2$, etc.

The above inorganic clay is preferably in the form of layers or sheets, and can be natural clay of silicate and aluminum oxide (for example, natural montmorillonite), organoclay (prepared from organic surfactant intercalated clay through ionic salt exchanging), exfoliated clay (for example, nanosilicate platelets), synthetic fluoride mica, synthetic nanoclay (SNC) or other proper inorganic clays (for example, K10, layered double hydroxides (LDH), kaolin, bentonite, synthetic layered clay, talc, attapulgite clay, laponite, vermiculite, etc.)

The organic surfactant of the present invention can be a cationic surfactant, a nonionic surfactant or an amphoteric surfactant; for example, fatty amine quaternary ammonium salt of C12~C32, HCl amine salt of C12~C32, alkylphenol ethoxylate or fatty alcohol ethoxylate. The preferred organic surfactant is octadecyl amine (ODA) or other alkyl amine salts and quaternary salts. For the resultant dispersant, the organic surfactant and the inorganic clay preferably have an organic/inorganic ratio of about 10/90~90/10.

In the present invention, polyoxyalkylene-amine has a molecular weight of about 200~10,000. One of this series of products, the Jeffamine® Amine series products, is commercially produced by Huntsman Co. For example, Jeffamine® diamine D-230, D-400, D-2000, D-4000, and ED-2003. Polyoxyalkylene-amine and the inorganic clay preferably have a cation exchanging capacity (CEC) ratio of about 0.1~1.0. For the resultant dispersant, the polyoxyalkylene-amine and the inorganic clay preferably have an organic/inorganic ratio of about 55/45~99/1.

DETAILED DESCRIPTION OF THE PREFERRED EMBODIMENTS

Figure 1:
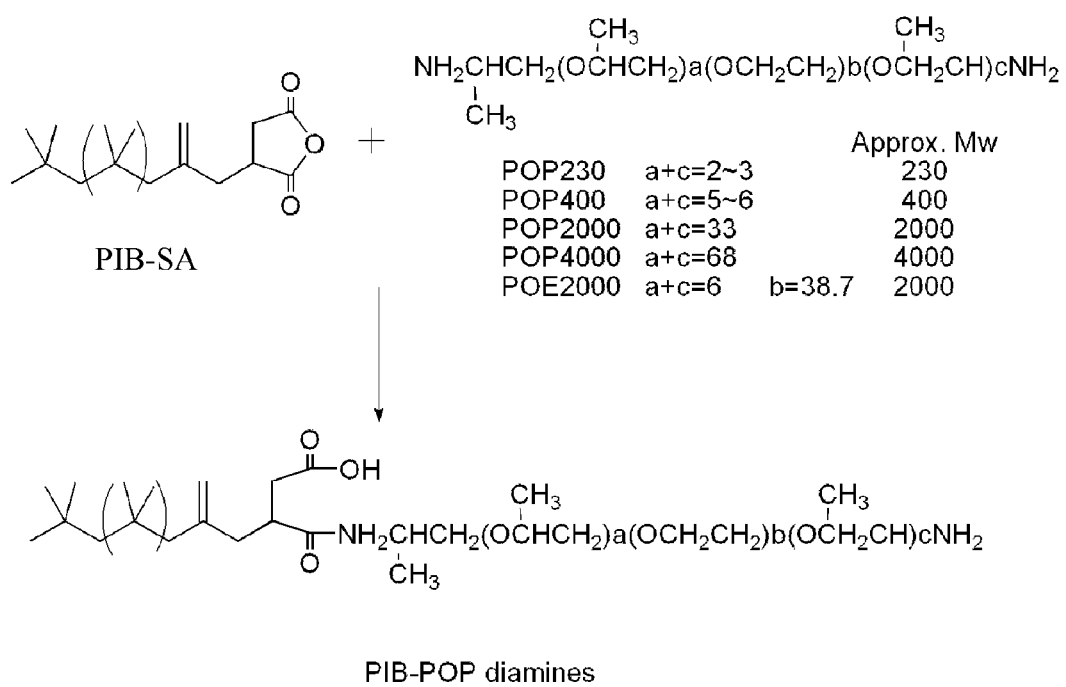
FIG. 1 shows the reaction for grafting PIB-SA with polyoxyalkylene-amine.

The intercalated inorganic clay of the present invention can be prepared by referring to R.O.C. (Taiwan) Patent No. 254064 and Pub. Nos. 550246 and 577904. The nanosilicate platelets of the present invention can be prepared by referring to R.O.C. Patent Nos. 280261, 284138 and 270529, and Pub. Nos. 577904 and 593480. The other materials used in the preferred embodiments (Examples) include:

1. Montmorillonite: $Na^+$-MMT, a product of Nanocor Ind. Co. (CEC=1.2 mequiv/g) and a product of Kunimine Ind. Co. (Kunipia-F, CEC=1.15 mequiv/g).

2. Synthetic Nanoclay: SNC, a product of CO-OP Chemical Co., LTD (CEC=0.7~1.2 mequiv/g).

3. Polyoxyalkylene-amine: Jeffamine® series products of Huntsman Chemical Co., for example, D-2000, T-403, T-5000; wherein D-2000 (poly(propylene glycol) bis(2-aminopropyl ether), Mw=2000) has a structural formula:

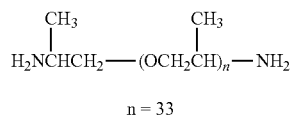

n = 33

4. TiO$_2$: nanoparticles, a product of BASF and Aldrich Chemical Co.

Example 1

Step (a): Na$^+$-montmorillonite (MMT) (10 g) is first dispersed in water (1 L) at 80° C. and then vigorously stirred for 4 hours to obtain a stable earth-colored dispersion.

Step (b): The polyoxypropylene diamine of Mw 2000 (D2000) (24 g, 12 mmol, CEC ratio of D2000/MMT=1.0) is dissolved in ethanol (100 ml), and equivalent moles of hydrochloric acid is added therein for acidification for 30 minutes. The acidified intercalation solution is added to the Na$^+$-MMT dispersion slowly and stirred at 60~70° C. for 6 hours for a cation exchanging reaction. Then the resultant reaction solution is separated into two phases. After filtration, the residual is washed with water for several times to remove the unreacted organics and the inorganic clay. The synthesized product (D2000/MMT hybrid) was analyzed to have an organic/inorganic weight ratio 74/26 and can be further dried in a vacuum oven at high temperature for 24 hours.

Examples 2~3, Comparative Examples 1~2

Repeat the steps of Example 1, but the dosage of D2000 is changed so that CEC=0.8, CEC=0.6, CEC=0.4, and CEC=0.2, respectively. The products (D2000/MMT) with organic/inorganic weight ratios 69/31, 63/37, 53/47, and 36/64 are obtained.

Example 4

Step (a): Na$^+$-MMT (100 g) is first dispersed in water (10 L) at 80° C. and then vigorously stirred for 4 hours to obtain a stable earth-colored dispersion.

Step (b): P-cresol (27.2 g) and D2000 (757.6 g) are weighted with a molar ratio 2:3 and circulated in toluene at 90° C. for 3 hours. Then a formaldehyde solution (37 wt %, 61.4 g) is added and the temperature is raised to 130° C. for reaction for 5 hours. When a gel is formed, the reaction is stopped and the product, an intercalating agent AMO (Amine-termination Mannich Oligomer), can be obtained. The AMO is analyzed with GPC and three peaks are found at Mw=3,142, 6,221 and 9,246, respectively. Results of amino titration are that primary amine=0.4 meq/g, secondary amine=0.56 meq/g, and no tertiary amine is found. Then the AMO is dissolved into water (575 g) and mixed with concentrated hydrochloric acid (35 wt %, 36 g) at 80° C. for 30 minutes to acidify the AMO. The acidified AMO is poured into the above Na$^+$-MMT dispersion and vigorously stirred at 80° C. for 5 hours. After the intercalation reaction is completed, a mixture solution of AMO/Clay is obtained.

Step (c): A buffer solution of water at various pH values is added into the mixture solution of AMO/Clay which then becomes a yellowish emulsification slurry.

Step (d): Ethanol (7.5 L) is added into the slurry. After filtration, the residual is added into ethanol (10 L) and stirred. After filtration, a semi-opaque yellowish mixture of AMO/MMT platelet silicates is obtained with an organic/inorganic (OA) ratio of about 40/60.

Step (e): The AMO/MMT mixture is added into ethanol (10 L) and stirred well. After water (10 L) is added and stirred well and then toluene (10 L) is then added and stirred well. After it is left to stand for one day, the mixture solution is separated into three phases, wherein the upper phase includes toluene and AMO, the middle phase includes ethanol, and the lower phase includes the product, a water solution of NSP.

Step (f): Octadecyl amine (ODA) and a water solution of NSP are mixed with an organic/inorganic weight ratio of 70/30 for modification of the nanosilicate platelets. After drying, an I/O dispersant (ODA/NSP) is obtained.

Comparative Example 3

Repeat the steps of Example 4, but ODA and the water solution of NSP are mixed with an organic/inorganic weight ratio of 30/70 in Step (f).

Example 5

Repeat Step (a) and Step (f) of Example 4, but NSP is replaced with MMT in Step (f). Then the product (ODA/MMT) with an organic/inorganic weight ratio 70/30 is obtained.

Example 6

Repeat Step (a) and Step (f) of Example 4, but MMT of Step (a) and NSP of Step (f) are replaced with synthetic nanoclay (SNC). Then the product (ODA/SNC) with an organic/inorganic weight ratio 70/30 is obtained.

Example 7

Repeat Step (a) and Step (f) of Example 4, but MMT of Step (a) and NSP of Step (f) are replaced with synthetic mica. Then the product (ODA/Mica) with an organic/inorganic weight ratio 70/30 is obtained.

Examples 8~12

Repeat the procedure in the R.O.C. (Taiwan) Patent No. 574370 "Combined Antifoulant of Derivative Disperser From Polyetheramine And PIBSA", so that PIB-SA-POP or PIB-SA-POE can be obtained by grafting hydrophobic polyisobutylene succinic anhydride (PIB-SA) with Jeffamine® diamine D-230 (or POP230), D-400 (or POP400), D-2000 (or POP2000), D-4000 (or POP4000), and ED-2003 (or POE2000). The reaction is shown in FIG. 1. The I/O dispersants are obtained by respectively mixing these PIB-SA-POP or PIB-SA-POE with clay.

Evaluation of Dispersants and Dispersions

1. Dispersions of Examples 1~7 and Comparative Examples 1~3

The modified clay is uniformly dispersed in heptane to have a concentration of 1~30 wt. %. Then TiO$_2$ (10 wt. % or 50 wt. %) are added for dispersion. Effects of the dispersants are evaluated by observing or measuring the mobility and the uniformity of the dispersions with a viscometer, SEM, TEM, AFM, and an interfacial tension meter are provided. Results are listed in Table 1.

TABLE 1

| Example/Comparative Example | Dispersant | CEC ratio | Organic/inorganic Weight ratio | Effect for dispersing $TiO_2$ 10 wt. % | Effect for dispersing $TiO_2$ 50 wt. % |
|---|---|---|---|---|---|
| Examples 1 | D2000/MMT | 1.0 | 74/26 | + | − |
| Examples 2 | D2000/MMT | 0.8 | 69/31 | + | − |
| Examples 3 | D2000/MMT | 0.6 | 63/37 | + | − |
| Comparative Examples 1 | D2000/MMT | 0.4 | 53/47 | − | − |
| Comparative Examples 2 | D2000/MMT | 0.2 | 36/64 | − | − |
| Examples 4 | ODA/NSP | — | 70/30 | + | + |
| Comparative Examples 3 | ODA/NSP | — | 30/70 | − | − |
| Examples 5 | ODA/MMT | — | 70/30 | + | + |
| Examples 6 | ODA/SNC | — | 70/30 | + | − |
| Examples 7 | ODA/Mica | — | 70/30 | + | − |

As shown in Table 1, the products D2000/MMT of Examples 1~3 can effectively disperse $TiO_2$ (10 wt. %), but those of Comparative Examples 1~2 can not. As for high solid content of $TiO_2$ (50 wt. %), none of the products D2000/MMT can disperse them well.

In Example 4, the product ODA/NSP with an organic/inorganic weight ratio 70/30 can effectively disperse $TiO_2$ (both 10 wt. % and 50 wt. %). However, when the organic/inorganic weight ratio is 30/70 as in Comparative Example 3, even $TiO_2$ (10 wt. %) can not be dispersed well.

In Example 5, the product ODA/MMT exhibits effect for dispersing $TiO_2$ as good as in Example 4. Both $TiO_2$ of 10 wt. % and 50 wt. % can be dispersed well.

In Comparative Examples 6 and 7, though the products ODA/SNC and ODA/Mica have higher organic/inorganic weight ratio 70/30, only TiO2 (10 wt. %) can be dispersed well.

Figure 2:
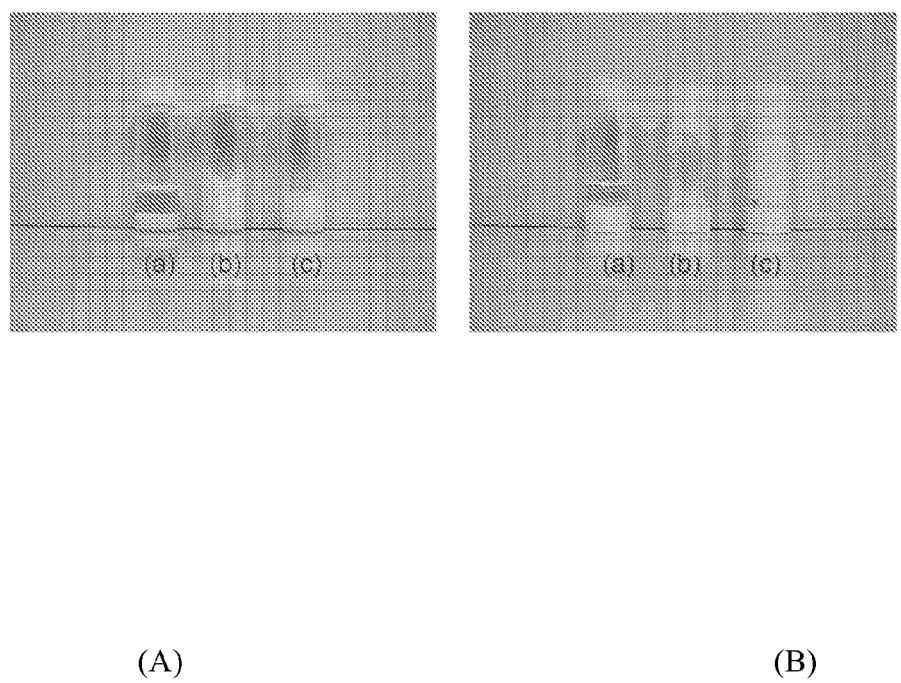
FIG. 2 shows the status of the TiO2 particles dispersed in a solvent with D2000/MMT as the dispersant (b), ODA/NSP as the dispersant (c), and without any dispersant (a).

FIG. 2 compares dispersions of $TiO_2$ (20 wt. % in hexane) with and without dispersant, and with different dispersants. Picture (B) shows the bottles of picture (A) upside down, wherein no dispersant is added in the bottle (a), D2000/MMT (10 wt. %) is added in the bottle (b), and ODA/NSP (10 wt. %) is added in the bottle (c). the results show that ODA/NSP (10 wt. %) results in the best mobility and uniformity, that is, the dispersion has a lowest viscosity. The dispersion including D2000/MMT (10 wt. %) is not as good as that of bottle (c), but much better than that of bottle (a) without adding the dispersant.

2. Dispersions of Examples 8~12

The I/O dispersants including PIB-SA-POP and PIB-SA-POE are first uniformly dispersed in methyl cyclohexane to have a concentration of 10 wt. %. Then different concentrations of $TiO_2$ (10 wt. % and 50 wt. %) are added for dispersion. Effects of the dispersants are evaluated by observing or measuring the mobility and the uniformity of the dispersions. Results shows that both PIB-SA-POP and PIB-SA-POE (10 wt. %) perform well in dispersion and are suitable for processes with a low dosage.

In the present invention, the organic layered clay greatly facilitates dispersion of $TiO_2$ in organic solvents when modified with organic surfactants or polyoxyalkylene-amine. By means of steric hindrance, different nanoparticles with different geometric shapes can reduce or countervail the energy thereof. For example, white $TiO_2$ pigment particles or photocatalysts can be dispersed by the natural clay having a layered structure. Such mechanism using a geometric principle is not related to adsorption or desorption, and thus thermal stability of dispersions will be improved.

In the present invention, the layered clay is modified to have a hydrophobic end, and therefore can serve as a dispersant without aggregation. The modified clay can promote mobility and stability of high-concentration dispersions of $TiO_2$, wherein the nanosilicate platelets (NSP) with a high aspect ratio (average 100×100×1 nm dimension), high surface area (700~800 m$^2$/g) and high charge density (20,000 ions/platelet) is particularly preferred. Accordingly, properties or characteristics of the dispersion, for example, lower viscosity, better thermal, UV and pH stability, are improved and thus suitable for many applications.

What is claimed is:

1. A method for dispersing nanoparticles of a metal oxide selected from the group consisting of $Fe_2O_3$, $Al_2O_3$, ZrO, $Ag_2O$ and $TiO_2$, comprising a step of mixing an inorganic/organic (I/O) dispersant and nanoparticles of the metal oxide,
   wherein the I/O dispersant is a composite of inorganic clay and an organic surfactant,
   wherein the organic surfactant is a quaternary ammonium salt of a fatty amine having C12-C32; the organic surfactant and the inorganic clay have an organic/inorganic weight ratio of 10/90-70/30; and the inorganic clay is nanosilicate platelets (NSP).

2. The method of claim 1, wherein the metal oxide is $TiO_2$.

3. A method for dispersing nanoparticles of a metal oxide selected from the group consisting of $Fe_2O_3$, $Al_2O_3$, ZrO, $Ag_2O$ and $TiO_2$, comprising a step of mixing an inorganic/organic (I/O) dispersant and nanoparticles of the metal oxide,
   wherein the I/O dispersant is a composite of inorganic clay and an organic surfactant,
   wherein the organic surfactant is octadecyl amine (ODA); the organic surfactant and the inorganic clay have an organic/inorganic weight ratio of 10/90-70/30; and the inorganic clay is nanosilicate platelets (NSP).

4. A method for dispersing nanoparticles of a metal oxide selected from the group consisting of $Fe_2O_3$, $Al_2O_3$, ZrO, $Ag_2O$ and $TiO_2$, comprising a step of mixing an inorganic/organic (I/O) dispersant and nanoparticles of the metal oxide,
   wherein the I/O dispersant is a composite of inorganic clay and polyoxyalkylene-amine which is further mixed with polyisobutylene succinic anhydride (PIB-SA),
   wherein the inorganic clay is natural clay of silicate and aluminum oxide; the polyoxyalkylene-amine and the inorganic clay have an organic/inorganic weight ratio of 55/45-74/26; and the polyoxyalkylene-amine has a molecular weight of 200-10,000.

5. The method of claim 4, wherein the metal oxide is $TiO_2$.

6. The method of claim 4, wherein the polyoxyalkylene-amine and the inorganic clay have a cation exchanging capacity ratio of 0.1-1.0.

* * * * *